(12) United States Patent
Seidel

(10) Patent No.: US 11,015,488 B2
(45) Date of Patent: May 25, 2021

(54) HEAT EXCHANGE SYSTEM WITH A JOINT ACTIVE FLUID MOTION DEVICE FOR THE CHARGING MODE AND FOR THE DISCHARGING MODE AND METHOD FOR EXCHANGING HEAT BY USING THE HEAT EXCHANGE SYSTEM

(71) Applicant: Siemens Gamesa Renewable Energy A/S, Brande (DK)

(72) Inventor: Volker Seidel, Barcelona (ES)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 15/751,521

(22) PCT Filed: Sep. 29, 2016

(86) PCT No.: PCT/EP2016/073354
§ 371 (c)(1),
(2) Date: Feb. 9, 2018

(87) PCT Pub. No.: WO2017/055505
PCT Pub. Date: Apr. 6, 2017

(65) Prior Publication Data
US 2018/0230859 A1 Aug. 16, 2018

(30) Foreign Application Priority Data

Sep. 30, 2015 (EP) ..................................... 15187732

(51) Int. Cl.
*F01K 3/18* (2006.01)
*F28D 20/00* (2006.01)
*F22B 1/02* (2006.01)

(52) U.S. Cl.
CPC ................ *F01K 3/186* (2013.01); *F01K 3/18* (2013.01); *F22B 1/02* (2013.01); *F22B 1/021* (2013.01);
(Continued)

(58) Field of Classification Search
CPC ........ F28D 17/00; F28D 17/005; F28D 17/04; F28D 20/0056; F28D 2020/0069;
(Continued)

(56) References Cited

U.S. PATENT DOCUMENTS 4,029,081 A * 6/1977 Strong .................... F24S 10/60
126/617
4,051,999 A * 10/1977 Granger ................ F24D 11/007
126/591
(Continued)

FOREIGN PATENT DOCUMENTS

CN 2713419 Y 7/2005
CN 1912477 A 2/2007
(Continued)

OTHER PUBLICATIONS

International Search Report and Written Opinion for PCT Application No. PCT/EP2016/073354, dated Dec. 19, 2016.
(Continued)

*Primary Examiner* — Mark A Laurenzi
*Assistant Examiner* — Xiaoting Hu
(74) *Attorney, Agent, or Firm* — Schmeiser, Olsen & Watts LLP

(57) ABSTRACT

A heat exchange system with at least one heat exchange chamber with heat exchange chamber boundaries which surround at least one heat exchange chamber interior of the heat exchange chamber, wherein the heat exchange chamber boundaries include at least one first opening for guiding in an inflow of at least one heat transfer fluid into the heat
(Continued)

exchange chamber interior and at least one second opening for guiding out an outflow of the heat transfer fluid out of the heat exchange chamber interior is provided. At least one heat storage material is arranged in the heat exchange chamber interior such that a heat exchange flow of the heat transfer fluid through the heat exchange chamber interior causes a heat exchange between the heat storage material and the heat transfer fluid.

9 Claims, 4 Drawing Sheets

(52) U.S. Cl.
CPC .......... *F28D 20/0056* (2013.01); *Y02B 30/52* (2013.01); *Y02E 60/14* (2013.01)

(58) Field of Classification Search
CPC .... F28D 2020/0078; F01K 3/18; F01K 3/186; F22B 1/02; F22B 1/021; F22B 1/028; F22B 1/1892; Y02E 60/142; Y02E 70/30; Y02E 60/14; Y02E 60/145; Y02E 20/14; F03G 6/003; F03G 6/005
See application file for complete search history.

(56) References Cited

U.S. PATENT DOCUMENTS

| | | | |
|---|---|---|---|
| 4,241,781 A * | 12/1980 | Eschner | ............... F24D 11/006 165/10 |
| 5,384,489 A * | 1/1995 | Bellac | ...................... F22B 1/06 290/44 |
| 9,410,748 B2 * | 8/2016 | Schneider | ........... F28D 20/0056 |
| 2008/0066736 A1 | 3/2008 | Zhu | |
| 2013/0126122 A1* | 5/2013 | Schneider | ........... F28D 20/0056 165/10 |
| 2014/0060046 A1 | 3/2014 | Takahashi et al. | |
| 2015/0075210 A1 | 3/2015 | Reznik et al. | |
| 2015/0167648 A1 | 6/2015 | Bergan | |

FOREIGN PATENT DOCUMENTS

| | | | |
|---|---|---|---|
| CN | 103673705 A | 3/2014 | |
| CN | 203550015 U | 4/2014 | |
| CN | 103782846 A | 5/2014 | |
| CN | 204460431 U | 7/2015 | |
| DE | 4333829 A1 | 4/1995 | |
| EP | 2653668 A1 | 10/2013 | |
| WO | WO-2011153971 A1 * | 12/2011 | .............. F22B 1/028 |
| WO | WO 2012148997 A2 | 11/2012 | |
| WO | 2014003577 A1 | 1/2014 | |
| WO | WO 2015131940 A1 | 9/2015 | |

OTHER PUBLICATIONS

Non-English Chinese Office Action for Application No. 201680057665.3, dated Mar. 29, 2019.

Chinese Office Action for Application No. 201680057665.3, dated Nov. 14, 2019.

* cited by examiner

State of the art

State of the art

HEAT EXCHANGE SYSTEM WITH A JOINT ACTIVE FLUID MOTION DEVICE FOR THE CHARGING MODE AND FOR THE DISCHARGING MODE AND METHOD FOR EXCHANGING HEAT BY USING THE HEAT EXCHANGE SYSTEM

CROSS-REFERENCE TO RELATED APPLICATIONS

This application claims priority to PCT Application No. PCT/EP2016/073354, having a filing date of Sep. 29, 2016, based off of European application No. EP 15187732 having a filing date of Sep. 30, 2015, the entire contents of both of which are hereby incorporated by reference.

FIELD OF THE TECHNOLOGY

The following refers to a heat exchange system with a heat exchange chamber and a method for exchanging heat by using the heat exchange system.

BACKGROUND

Despite the integration of renewable energy into the public electric energy system (power grid) a large share of electricity is nowadays still generated by fossil energy sources. But the global climate change requires the further development of renewable energies.

The energy output of renewable energy sources like wind and solar is not constant throughout a day or throughout a year. Consequently, electricity which is generated by utilizing energy from renewable energy sources fluctuates.

In order to manage this fluctuating electricity, heat (thermal energy) storage systems are developed for storing and releasing thermal energy (heat exchange system). Such a heat exchange system comprises a heat exchange chamber with heat exchange chamber boundaries which surround a heat exchange chamber interior. The heat exchange chamber interior is filled with heat storage material like stones. The heat exchange chamber boundaries comprise a first opening for guiding an inflow of a heat transfer fluid, e.g. air, into the heat exchange chamber interior and a second opening for guiding out an outflow of the heat transfer fluid out of the heat exchange chamber interior.

For a charging mode, the heat exchange system additionally comprises a charging unit for heating the heat transfer fluid with the aid of excess electricity. The resulting hot heat transfer fluid is infused into the heat exchange chamber interior via the first opening of the heat exchange chamber boundaries. This first opening defines a "hot" terminal of the heat exchange chamber. The hot heat transfer fluid is guided through the heat exchange chamber interior. By the guiding of the hot heat transfer fluid through the heat exchange chamber interior a heat transfer from the heat transfer fluid to the heat storage material is caused. Heat is stored by the heat storage material.

Via the second opening of the heat exchange chamber the resulting "cold" heat transfer fluid is guided out of the heat exchange chamber interior. Thereby, the second opening of the heat exchange chamber boundaries defines a "cold" terminal (end) of the heat exchange chamber. The charging mode is stopped when the temperature at the cold terminal of the heat exchange chamber begins to rise above a predetermined temperature.

In a discharging mode of the heat exchange chamber this stored heat can be recovered: "cold" heat transfer fluid is infused into the heat exchange chamber interior via the first opening of the heat exchange chamber boundaries. In this case, the first opening defines a "cold" terminal. The cold heat transfer fluid is guided through the hot heat exchange chamber interior. By the guiding of the cold heat transfer fluid through the heat exchange chamber interior a heat transfer from the heat storage material to the heat transfer fluid is caused. Heat is released from the heat storage material.

Via the second opening of the heat exchange chamber boundaries the resulting "hot" heat transfer fluid is guided out of the heat exchange chamber interior. Thereby, the second opening of the heat exchange chamber defines a "hot" terminal of the heat exchange chamber.

The resulting hot heat transfer fluid can be used for generating steam with which a steam turbine is driven. A result of the described discharging mode: Heat is transformed back to electricity.

The discharging mode is stopped when the temperature at the cold terminal of the heat exchange storage begins to drop below a certain temperature.

The respective duct systems for the charging cycle and the discharging cycle of the heat exchange system are quite expensive.

SUMMARY

An aspect relates to providing a heat exchange system with reduced costs for its installation in comparison to the state of the art.

A heat exchange system is provided with at least one heat exchange chamber with heat exchange chamber boundaries which surround at least one heat exchange chamber interior of the heat exchange chamber, wherein the heat exchange chamber boundaries comprise at least one first opening for guiding in an inflow of at least one heat transfer fluid into the heat exchange chamber interior and at least one second opening for guiding out an outflow of the heat transfer fluid out of the heat exchange chamber interior. At least one heat storage material is arranged in the heat exchange chamber interior such that a heat exchange flow of the heat transfer fluid through the heat exchange chamber interior causes a heat exchange between the heat storage material and the heat transfer fluid. The heat exchange system can be operated in an operating mode which is selected from the group consisting of charging mode with a heat transfer from the heat transfer fluid to the heat storage material and a discharging mode with a heat transfer from the heat storage material to the heat transfer fluid. The heat exchange system is equipped with at least one joint active fluid motion device with which the heat exchange flow of the heat transfer fluid through the heat exchange chamber interior during the charging mode and during the discharging mode is caused. The active fluid motion device is a joint active fluid motion device which is used for the charging mode and for the discharging mode of the heat exchange system. In a preferred embodiment, the active fluid motion device is selected from the group consisting of blower, fan and pump.

A heat exchange system concerning the state of the art comprises at least one active fluid motion device for each of the charging cycle and the discharging cycle. With the aid of embodiments the invention, at least one of the active fluid motion devices can be omitted.

In a preferred embodiment, the heat exchange system is equipped with at least one passive fluid control device for controlling the heat exchange flow through the heat exchange chamber interior which is selected from the group consisting of activatable bypass pipe, damper, flap, nozzle and valve. For instance, two flaps are arranged at two openings in order to adjust the inflows of the heat transfer fluid into the heat exchange chamber interior and consequently in order to adjust the temperature distribution in the heat exchange chamber interior.

In addition to the heat exchange system, a method for exchanging heat by using the heat exchange is provided, wherein in an operating mode of the heat exchange system the heat exchange flow of the heat transfer fluid is guided through the heat exchange chamber interior, wherein a heat exchange between the heat storage material and the heat transfer fluid is caused, the operating mode is selected from the group consisting of charging mode and discharging mode and the heat exchange flow for the charging mode and the heat exchange flow for the discharging mode are caused by the same active fluid motion device.

The heat exchange chamber is a space, cavity or a housing in which the heat storage material is located. Inside of the heat exchange chamber the heat exchange takes place. In order to provide an efficient heat exchange, the heat exchange chamber is preferably thermally insulated against the surroundings. The loss of heat is reduced by the thermal insulation.

The heat transfer fluid is guided (led) into the heat exchange chamber interior via the first opening and is guided out of the heat exchange chamber interior via the second opening. The first opening of the heat exchange chamber boundaries is an inlet opening. The second opening of the heat exchange chamber boundaries is an outlet opening. Thus, there are different areas of the heat exchange chamber boundaries, namely an inlet area of the heat exchange chamber boundaries with the first opening and an outlet area of the heat exchange chamber boundaries with the second opening.

The operating mode of the heat exchange system is selected from the group consisting of charging mode with a heat transfer from the heat transfer fluid to the heat storage material and discharging mode with a heat transfer from the heat storage material to the heat transfer fluid.

Depending on the operating mode, a specific opening can have the function of an inlet opening or the function of an outlet opening. The flow direction of the heat exchange flow depends on the operating mode. Preferably, during the charging mode the heat exchange flow is directed in a charging mode direction, during the discharging mode the heat exchange flow is directed in a discharging mode direction and the charging mode direction and the discharging mode direction are opposed to each other (countercurrent operation). But, a change of the directions of the heat exchange flow is not necessary. Charging mode direction and discharging mode direction comprise the same direction (co-current operation).

In countercurrent operation, switching from the charging mode to the discharging mode the direction of the heat exchange flow through the heat exchange chamber interior is reversed and consequently, the function of the openings (inlet opening, outlet opening) is reversed, too. With such a solution it is especially advantageous to use the same heat transfer fluid for the charging mode and for the discharging mode. But of course, different heat transfer fluids for the charging mode and the discharging mode can be used, too.

For the charging mode, the heat exchange system is equipped with at least one charging unit for heating the heat transfer fluid. In the charging mode with activated charging unit, the charging unit can be located upstream of the heat exchange chamber. In contrast to that, in the discharging mode with a deactivated charging unit, the charging unit can be located downstream of the heat exchange chamber.

Preferably, the charging unit comprises at least one electrical heating device which is selected from the group consisting of resistance heater, inductive heater, emitter of electromagnetic radiation and heat pump. The electromagnetic radiation is preferably infrared radiation. A combination of different electrical heating devices is possible. With the aid of the electrical heating devices electricity is transformed into heat. This heat is absorbed by the heat transfer fluid and transported to the heat storage material in the heat exchange chamber interior.

For instance, the electrical heating device comprises a resistance heater. This heater is located in the heat exchange inflow upstream of the heat exchange chamber. The heat transfer fluid is heated up before entering of the heat exchange chamber interior. The resistance heater comprises a large heat exchange area for an efficient heat exchange from the resistance heater to the heat transfer fluid. For instance, the large heat exchange area is formed by a grid of the resistance heater. A meander shaped resistance heater is possible, too. With such a measure, the heat transfer to the heat transfer fluid is enhanced. In addition, the possibility of the (not desired) occurrence of hot spots within the resistance heater is reduced.

The heat exchange system is preferably equipped with at least one discharging unit for discharging the heat transfer fluid of the outflow from heat for production of electricity. Heat is removed from the heat transfer fluid. The removed heat is transformed into electricity. In a preferred embodiment, the transformation of heat into electricity is carried by a water/steam cycle for driving a turbine of a steam power plant.

The discharging mode can be realized when electricity prices and demand are high or when the production of renewable energies is low. For that and in order to limit the costs which are connected to embodiments of the invention, it is advantageous to use existing power plants. So, the heat exchange system is a kind of retrofit system. For instance, well suited are CCPP (combined cycle power plant) since their heat recovery steam generator (HRSG) is similar to the application proposed here. Nevertheless, hard coal, oil, gas, waste incineration, wood or lignite fired power plants can be used since the charging unit can be designed for high temperatures to match the temperatures used in the steam generator. In a hybrid mode the fuel can be used to increase the temperature from the temperature level of the heat exchange system to the operating temperature of the original furnace or boiler design.

The heat storage material can be liquid and/or solid. For instance, a core of the heat storage material is solid and a coating of this solid core is liquid. Such a liquid coating can comprise ionic liquid.

The solid material comprises preferably bulk material. Mixtures of different liquid materials and different solid materials are possible as well as mixtures of liquid and solid materials.

It is possible that the heat storage material is a thermochemical energy storage material: Thermal energy can be stored via an endothermic reaction whereas thermal energy can be released via an exothermic reaction. Such a thermochemical storage material is for instance the calcium oxide/calcium hydroxide system.

The heat storage materials can be arranged in one or more specific containers made of non-reactive container material. Non-reactive means that no chemical reaction between the heat storage material and the container material takes place during the heat exchange process.

In a preferred embodiment, the heat storage material comprises at least one chemically and/or physically stable material. In the range of the operational temperature of the heat exchange system the heat storage material does not change its physical and/or chemical properties. A physically stable material does not change its physical properties during the heat exchange. For instance, the heat storage material remains in a solid state in the operating temperature range. A chemically stable material does not change its chemical composition during the heat exchange. For instance, such a chemically stable material is a phase change material (PCM).

Moreover, a complex heat exchange system with different heat exchange chambers with different heat storage materials and/or different heat transfer fluids is possible, too. For Instance, a heat exchange chamber with stones as heat storage material and a heat exchange chamber with a phase change material as a heat storage material are combined together (in parallel or in series).

In a preferred embodiment, the heat storage material comprises sand and/or stones. The stones can be natural stones or artificial stones. Mixtures thereof are possible, too. Artificial stones can consist of containers which are filled with heat storage material. This heat storage material is for instance a phase change material or a thermo-chemical storage material (see above).

Preferably, the stones comprise gravel (pebbles), nibbles and/or grit (splits). The artificial material comprises preferably clinkers or ceramics. Again, mixtures of the mentioned materials are possible, too.

In order to provide a cheap energy storage material it is advantageous to use waste material. Therefore, in a preferred embodiment, the artificial material comprises at least one by-product of an industrial process. For instance, the by-product is iron silicate. Iron silicate origins from a slag of copper production.

In a preferred embodiment, heat exchange channels are embedded in the heat storage material for guiding of the heat exchange flow through the heat exchange chamber interior. The heat storage material forms a heat exchange bed. The heat exchange bed comprises the heat exchange channels. The heat exchange channels are embedded into the heat storage bed such that the heat exchange flow of the heat transfer fluid through the heat exchange channels causes the heat exchange between the heat storage material and the heat transfer fluid. The heat exchange channels can be formed by interspaces (gaps) of the heat storage material. For instance, the heat storage material comprises stones. The stones form the heat exchange bed with the heat exchange channels. In addition or alternatively, the heat storage material is porous. Open pores of the heat storage material form the heat exchange channels.

The heat transfer fluid is selected from the group consisting of a liquid and a gas. The gas is selected from the group consisting of inorganic gas and/or organic gas. The inorganic gas is preferably air. Mixtures of different liquids are possible as well as mixtures of different gases.

Preferably, the heat transfer fluid comprises a gas at ambient gas pressure. Preferably, the gas at the ambient pressure is air. The ambient pressure (900 hPa to 1,100 hPa) varies such that the heat exchange flow through the heat exchange chamber interior is caused.

For the guiding of the heat transfer fluid into the heat exchange chamber interior and for the guiding of the heat transfer fluid out of the heat exchange chamber interior a pipe system (or channel system, ducting system) is used. This pipe system can be closed (with a closed loop) or can be open (with an open loop).

For instance the heat transfer fluid is ambient air of the environment. The loop is an open loop. Air from the environment is introduced into the heat exchange system and air of the heat exchange system is released to the surroundings. There is an air exchange during the operation of the heat exchange system.

In contrast to that, there is no air exchange or a selectively adjustable air exchange during the operation in a closed loop. Air of the environment is not added or just added on a small scale to the air which is used as heat transfer fluid. This has following specific advantage: In a situation with almost completely charged heat storage material, heat transfer fluid with remaining heat would be released to the environment in an open loop. The remaining heat is lost. In contrast to that, in a closed loop this heat transfer fluid with remaining heat stays in heat exchange system. The remaining heat is not lost. Therefore, in a preferred embodiment, a closed loop is implemented and wherein the inflow comprises the outflow. The outflow is guided back into the heat exchange chamber interior.

The heat exchange chamber is a vertical heat exchange chamber and/or a horizontal heat exchange chamber.

The term "horizontal heat exchange chamber" implies a horizontal main (average) flow of the heat transfer fluid through the heat exchange chamber interior. The flow direction of the horizontal main flow is essentially parallel to the average surface of the earth. The horizontal direction is essentially a perpendicular direction to the direction of the gravity force which affects the heat transfer fluid. Perpendicular means in this context that deviations from the perpendicularity of up to 20° and preferably deviations of up to 10° are possible.

A horizontally oriented direction of the heat exchange flow can be achieved by lateral first openings and/or lateral second openings. The horizontal heat exchange chamber comprises these openings in its side heat exchange chamber boundaries. In addition, with the aid of an active fluid motion device like a blower or a pump the heat exchange flow in the heat exchange chamber interior is caused. The heat transfer fluid is blown or pumped into the heat exchange chamber interior or is pumped or sucked out of the heat exchange chamber interior.

In contrast to the term "horizontal heat exchange chamber", the term "vertical heat exchange chamber" implies a vertical main flow of the heat transfer fluid through the heat exchange chamber interior. For instance, the operating mode is the charging mode. In a vertical heat exchange chamber the heat exchange flow is preferably directed downwards (top down) during the charging mode. The vertical main flow (essentially parallel but in the opposite direction to the direction of gravity force) can be caused by an active fluid motion device (blower or pump). The first opening is located at a top of the heat exchange chamber and the second opening is located at a bottom of the heat exchange chamber.

Based on natural convection, in a vertical heat exchange chamber the temperature of the heat storage material along a cross section perpendicular to the flow direction of the heat transfer fluid is approximately the same (horizontal isothermal lines).

In contrast to that, in a horizontal heat exchange chamber due to natural convection the temperature of the heat storage material along the cross section perpendicular to the flow direction of the heat transfer fluid (see below) can differ (inclined isothermal lines).

It has to be noted that the terms "horizontal" and "vertical" are independent from the dimensions of the heat exchange chamber and its orientation. Decisive is the direction of the flow of the heat transfer fluid through the heat exchange chamber interior. For instance, a "horizontal heat exchange chamber" can have a chamber length which is less than the chamber height of the heat exchange chamber.

Besides pure vertical and horizontal heat exchange chambers, a mixture of "vertical heat exchange chamber" and "horizontal heat exchange chamber" is possible, too. In such a heat exchange chamber, the main flow of the heat transfer fluid is the result of horizontal and vertical movement of the heat transfer fluid through the heat exchange chamber interior.

In a preferred embodiment, at least two first openings are arranged vertically to each other and/or at least two second openings are arranged vertically to each other. Openings are arranged above each other. By this measure it is possible to influence a vertical distribution of heat exchange flows in order to improve a temperature distribution (temperature front) in the heat storage material and heat exchange chamber interior respectively. Isothermal lines perpendicular to the flow direction are influenced.

The temperature front is defined by neighboring cold and hot areas of the heat storage material in the heat exchange chamber interior caused by the flow of the heat transfer fluid through the heat exchange chamber interior. The temperature front is aligned perpendicular to the respective flow direction of the heat exchange flow through the heat exchange chamber. During the charging mode the heat exchange flow is directed in a charging mode direction wherein the temperature front moves along this charging mode direction. In contrast to that, during the discharging mode the heat exchange flow is directed in the discharging mode direction (opposite to the charging mode direction) wherein the temperature front moves along the discharging mode direction. In both cases, the temperature front of the heat exchange chamber is migrating through the heat exchange chamber to the respective hot/cold ends of the heat exchange chamber. It is to be noted that in case of countercurrent operation, the hot (hot opening) end remains the hot end (hot opening), independently from the mode (charging mode or discharging mode).

The temperature front is a zone of strong temperature gradient in the heat storage material, i.e. high temperature difference between hot and cold areas. In this application it separates the hot (charged with heat) and the cold (not charged) zone in the heat exchange chamber with the heat storage material. The temperature front develops due to the transfer of heat from the heat transfer fluid to the heat storage material during the charging mode and due to the transfer of heat from the heat storage material to the heat transfer fluid during the discharging mode. Isothermal zones/lines develop ideally (e.g. without the influence of gravitation) perpendicular to the main flow direction, i.e. zones/lines of constant temperature.

In order to optimize the efficiency of the heat exchange system it is advantageous to ensure a uniform temperature front. There are just small variations concerning the temperature gradients perpendicular to the flow direction. In a vertical heat exchange chamber with a flow direction top down, the temperature front is nearly uniform due to natural convection. So, in this case additional measures are not necessary. In contrast to that, natural convection leads to a non-uniform temperature front in a horizontal heat exchange chamber. So, in this case additional measures could be meaningful (like usage of more openings or usage of more flow adjusting elements).

Preferably, the chamber boundary with one of the openings comprises a transition area with a tapering profile such that an opening diameter of the opening aligns to a first tapering profile diameter of the tapering profile and a chamber diameter of the heat exchange chamber aligns to a second tapering profile diameter of the tapering profile. The transition area comprises an increasing cross section from the respective opening towards the heat exchange chamber. This is especially advantageous for the first opening for guiding the heat transfer fluid into the heat exchange chamber. The diameter of the transition area expands from the opening diameter of the first opening to the diameter of the heat exchange chamber. With the aid of the tapering profile the inflow of the heat transfer fluid is guided into the heat exchange chamber interior. The guided inflow is distributed to a wide area with the heat storage material. By this measure a capacity of the heat exchange unit (heat storage material which is located in the heat exchange chamber) can be highly exploited. In addition, the efficiency of the heat exchange can be improved by adapting the heat exchange flow. Remark: For additionally adapting the heat exchange flow, a diffuser can be located at the first opening, especially in the transition area. By the diffuser an incident flow of the heat transfer fluid into the heat exchange chamber interior can be adjusted. For instance, such a diffuser is formed by stones which are located in the transition area with the tapering profile.

For the case that the heat exchange chamber comprises a number of first openings it is very advantageous to arrange a described transition area at that number of first openings. Thereby, the first openings can comprise a joint transition area or individual transition areas.

The transition area with the second opening for guiding the heat transfer fluid out of the heat exchange chamber interior can be tapered, too. By this measure the guiding of heat flow out of the heat exchange chamber interior of the heat exchange chamber is simplified.

In this context, the use of a short transition area is very advantageous. For instance, the short transition area comprises a dimension which is less than 50% of a length of the heat exchange chamber. For instance, the dimension is about 20% of the length of the heat exchange chamber. The length is the dimension of the heat exchange chamber that is parallel to the main flow direction of the heat transfer fluid through the heat exchange chamber interior. But of course, the dimension of the transition area is dependent on a number of features of the complete heat exchange system, e.g. temperature of the heat transfer fluid, mass flow of the heat exchange flow, speed of the heat exchange flow at the relevant opening temperatures, etc.

In order to save space and in order to reduce the surface-volume ratio for a reduced heat loss, it is advantageous to implement a transition area as short as possible. The result is a short transition channel for guiding the inflow into the heat exchange chamber interior. Besides an efficient usage of the capacity of the heat exchange chamber a low space requirement is connected to this solution.

Preferably, the heat exchange chamber comprises a cylindrically shaped chamber boundary. For instance, the chamber boundary which comprises the first opening is formed as a circular cylinder and/or the chamber boundary with the second opening is formed as a circular cylinder. Such shapes lead to best surface-volume ratios.

The dimensions of the heat exchange chamber can be different. But, embodiments of the invention are especially advantageous for heat exchange systems with large heat exchange chambers. Therefore, in a preferred embodiment, the horizontal heat exchange chamber comprises a heat exchange chamber length which is at least twice of a heat exchange chamber width of the heat exchange chamber and/or which is at least twice of a heat exchange chamber height of the heat exchange chamber. Preferably, the heat exchange chamber length is selected from the range between 20 m and 300 m. In addition, the heat exchange chamber width and/or the heat exchange chamber height are selected from the range of 1 m to 100 m.

The heat exchange system is especially adapted for operation at high temperatures of more than 300° C. Therefore, in a preferred embodiment, an operating temperature of the operating mode is selected from the range between 300° C. and 1000° C., preferably selected from the range between 500° C. and 1000° C., more preferably selected from the range between 600° C. and 1000° C., 650° C. to 1000° C. and most preferably between 700° C. and 1000° C. A deviation of the temperature ranges is possible. In this context, very advantageous is an upper limit of the temperature range of 900° C. and most preferably an upper limit of the temperature range of 800° C. The heat exchange system is a high temperature heat exchange system.

Embodiments of the proposed invention can be applied for renewable energy production as well as for conventional energy production. For instance, in order to increase the flexibility the steam cycle of fossil fired power plants (or nuclear power plants, etc.) it can be combined with the heat exchange system proposed here. In this case, the boiler of the seam cycle of the power plant can be operated with fuel when fuel costs are lower than electricity costs and the heat exchange system is charged in periods when electricity prices are low. Alternatively, the charging can take place during a period of excess production of energy.

With embodiments of the invention costs for the installation of a heat exchange system and its operation can be saved. For the charging cycle and for the discharging cycle the same flow adjusting device or devices are used. Thereby, costs are saved concerning the needed devices, their installation and their maintenance.

BRIEF DESCRIPTION

Some of the embodiments will be described in detail, with reference to the following figures, wherein like designations denote like members, wherein.

Figure 1:
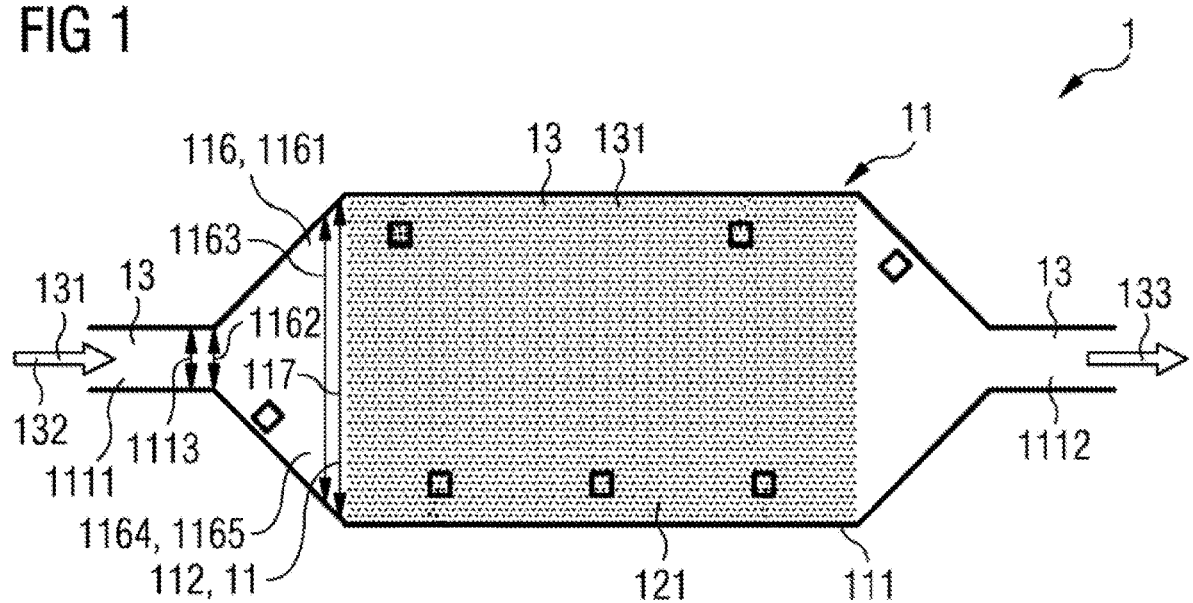
FIG. 1 shows a heat exchange chamber of the heat exchange system.

Core of embodiments of the invention is a heat exchange system 1 with a heat exchange chamber 11 on a high temperature level.

DETAILED DESCRIPTION

Heat storage material 121 (e.g. stones or sand) which is located in the heat exchange chamber interior 112 of the heat exchange chamber 11 can be charged and discharged with heat via the heat transfer fluid 13. Heat is stored by the heat storage material 121 and can be released from the storage material.

The temperature level of the stored heat is significantly higher compared to methods applied so far to increase the efficiency. The temperature level lies between 300° C. and 1000° C., preferably between 500° C. and 1000° C., more preferably between 650° C. and 1000° C. and most preferably between 700° C. and 1000° C. The thermal capacity of the heat exchange system 1 lies in the range between 0.3 GWh and 100 GWh which causes a thermal power of 50 MW.

The heat exchange system 1 comprises at least one heat exchange chamber 11 with heat exchange chamber boundaries 111 which surround at least one heat exchange chamber interior 112 of the heat exchange chamber 11. The heat exchange chamber 11 is a horizontal heat exchange chamber 113.

The heat exchange chamber boundaries 111 comprise at least one first opening 1111 for guiding in an inflow 132 of at least one heat transfer fluid 131 into the heat exchange chamber interior 112 and at least one second opening 1112 for guiding an outflow 133 of the heat transfer fluid 131 out of the heat exchange chamber interior 112. At least one heat storage material 121 is arranged in the heat exchange chamber interior 112 such that a heat exchange flow 13 of the heat transfer fluid 131 through the heat exchange chamber interior 112 causes a heat exchange between the heat storage material 121 and the heat transfer fluid 131.

The heat exchange system can be operated in an operating mode which is selected from the group consisting of charging mode with a heat transfer from the heat transfer fluid to the heat storage material and a discharging mode with a heat transfer from the heat storage material to the heat transfer fluid.

The heat exchange system is equipped with at least one active fluid motion device with which the heat exchange flow of the heat transfer fluid through the heat exchange chamber interior during the charging mode and during the discharging mode is caused. The active fluid motion is a blower.

In addition, the heat exchange system is equipped with a number of passive fluid control devices for controlling the heat exchange flow through the heat exchange chamber interior. These passive fluid control devices are damper and valves.

Figure 3:
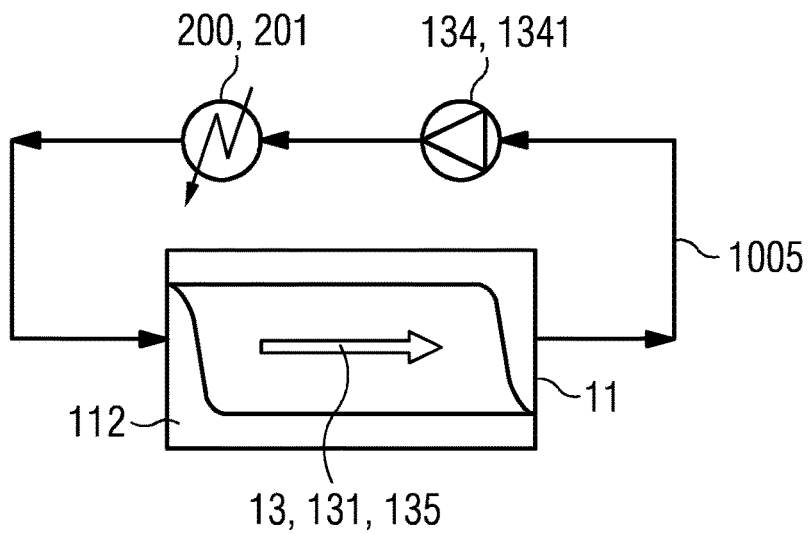
FIG. 3 shows the heat exchange system of the state of the art in a charging mode.
Figure 4:
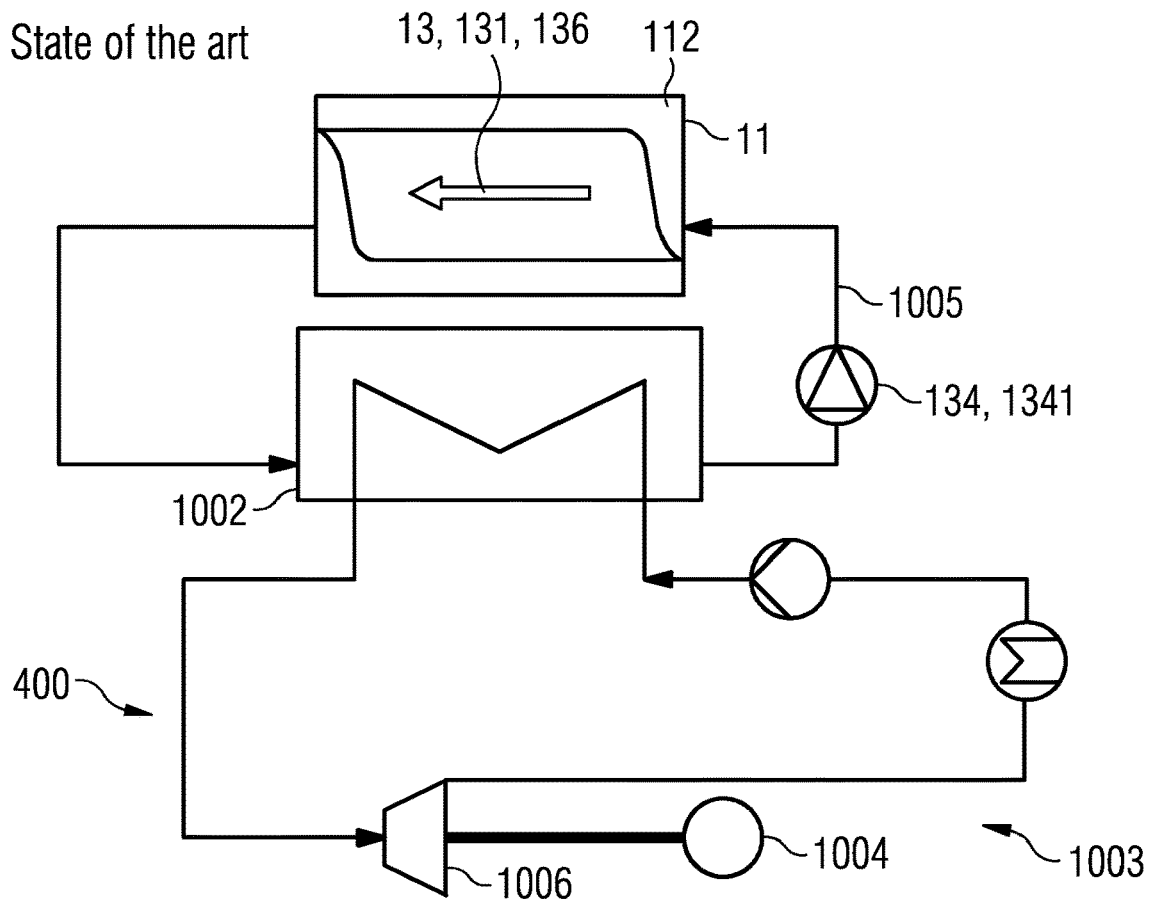
FIG. 4 shows the heat exchanges system of the state of the art in a discharging mode.
Figure 5:
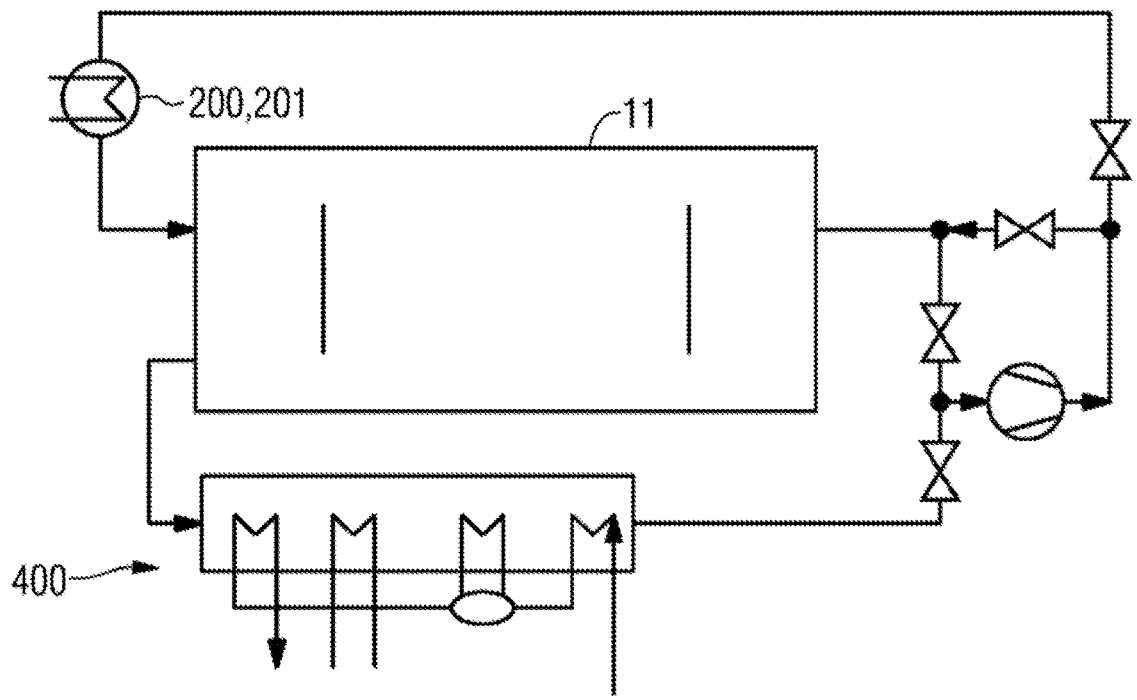
FIG. 5 shows the heat exchange system with one joint active fluid motion device for charging cycle and the discharging cycle.
Figure 6:
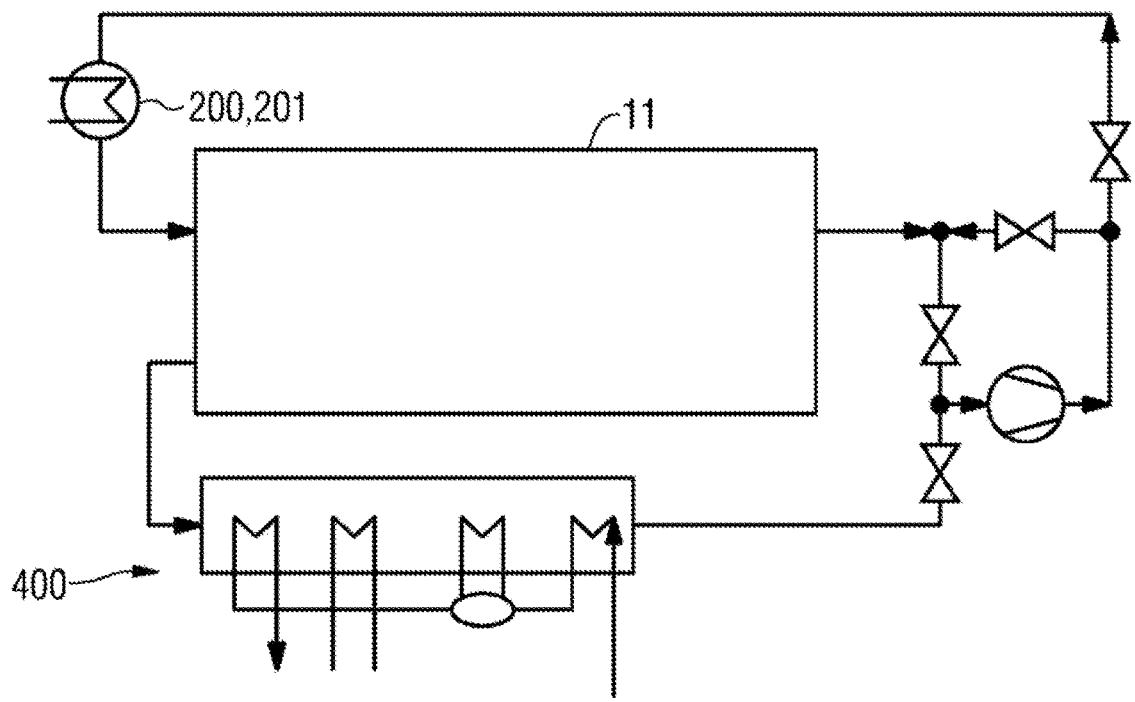
FIG. 6 shows the heat exchange system with one joint active fluid motion device for charging cycle and the discharging cycle.
Figure 7:
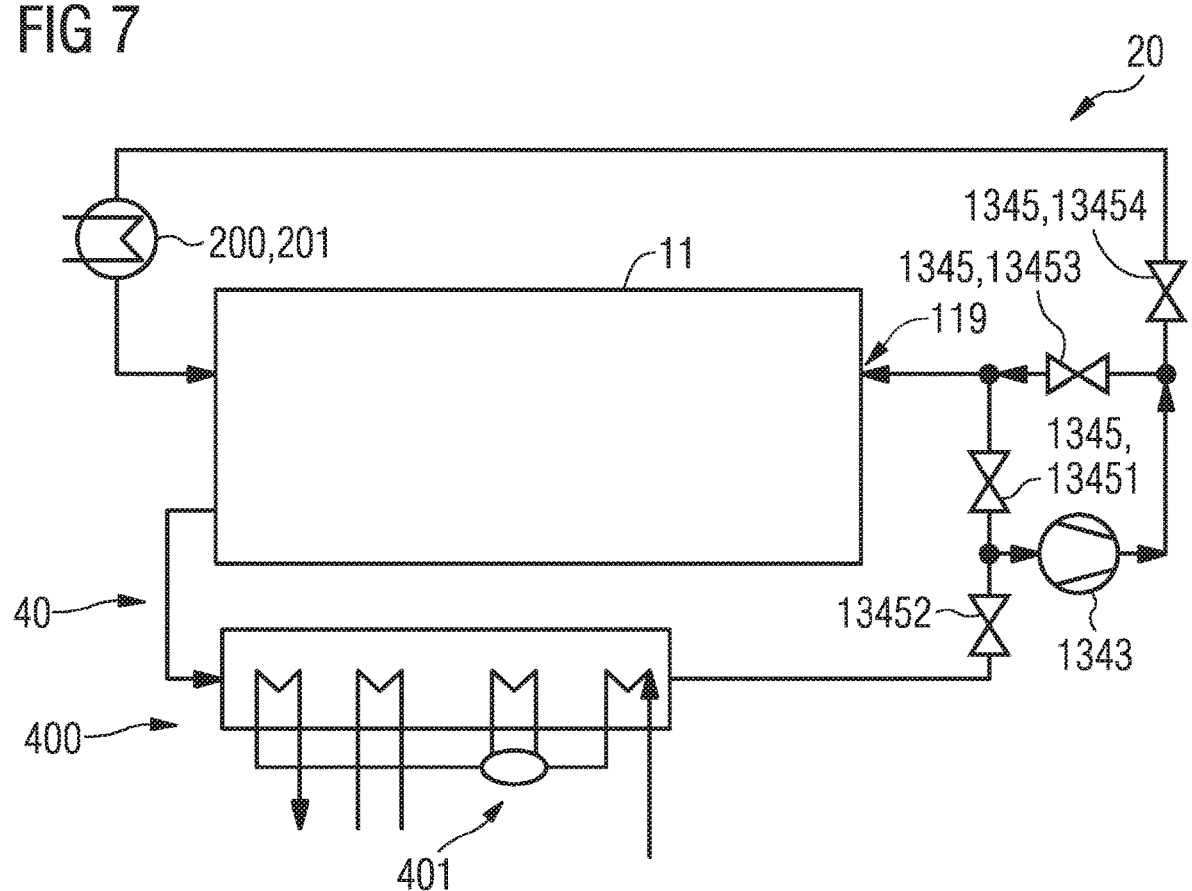
FIG. 7 shows the heat exchange system with one joint active fluid motion device for charging cycle and the discharging cycle.

A heat exchange system concerning the state of the art with at least one active fluid motion device for each of the charging cycle and the discharging cycle is depicted in FIGS. 3 and 4. FIG. 5 show a heat exchange system with open charging and discharging cycles. FIG. 6 show a heat exchange system with closed charging cycle and an open discharging cycle, whereas FIG. 7 shows a heat exchange system with an open charging cycle, but a closed discharging cycle.

Exemplarily, the heat exchange chamber length of the horizontal heat exchange chamber 11 is about 200 m, the heat exchange chamber height of the heat exchange chamber 11 is about 10 m and the heat exchange chamber width of the heat exchange chamber is about 50 m.

With the aid of the proposed heat exchange system 1, thermal energy can be stored on a high temperature level during the charging mode. This stored thermal energy can be used during the discharging mode for the production of steam in a water steam cycle for reconversion into electrical energy.

One or more heat exchange chambers 11 are filled with solid heat storage material 121. The solid heat storage material comprises stones. Alternatively, sand is used.

There is a transition area 116 of the heat exchange chamber 11 with a tapering profile 1161. Thereby an opening diameter 1113 of the opening 1111 or 1112 aligns to a first tapering profile diameter 1162 of the tapering profile 1161 and a chamber diameter 117 of the heat exchange chamber 11 aligns to a second tapering profile diameter 1163 of the tapering profile 1161.

The inflow 132 of the heat transfer fluid 13 is guided into the heat exchange chamber interior 112. The guided inflow 132 is distributed to a wide area of heat storage material 121. By this measure a capacity of the heat exchange unit (heat storage material 121 which is located in the heat exchange chamber interior 112) can be utilized in an advantageous manner.

The transition area 116 is short. The short transition area 116 projects into the heat exchange chamber 11. The result is a short transition channel for the guiding of the inflow 132 into the heat exchange chamber interior 112 of the heat exchange chamber 11.

In the charging mode, the heat transfer fluid 131 enters the heat exchange chamber 11 through a diffuser 1164. The diffuser 1164 comprises stones 1165 and is arranged at the transition area 116 of the heat exchange chamber 11.

The heat exchange flow 13 of the heat transfer fluid 131 is directed in the charging mode direction 135. The flow adjusting element 134, 1341 is advantageous installed upstream of the charging unit 200, 201 (FIG. 3): Relatively cold heat transfer fluid passes the flow adjusting element 134, 1341 before absorbing heat from the charging unit.

Figure 2:
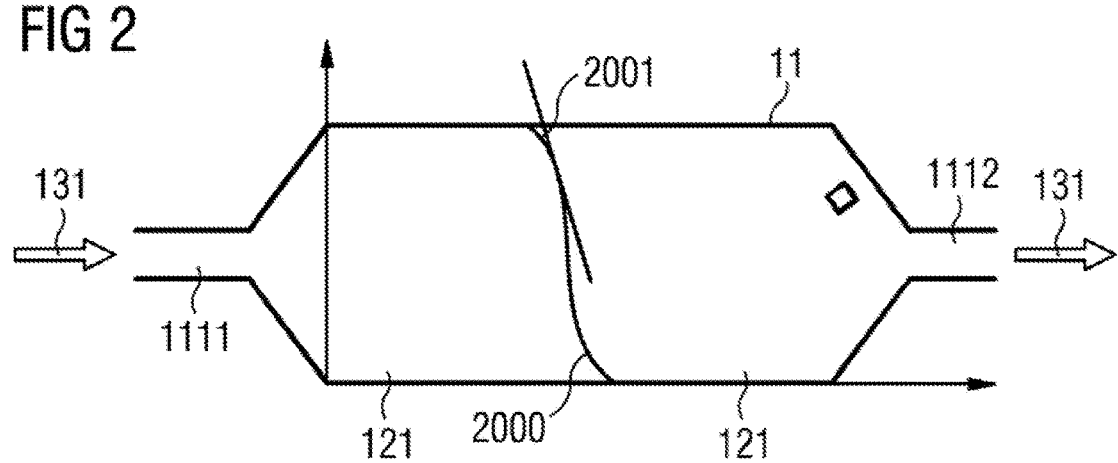
FIG. 2 shows a temperature distribution of the heat exchange chamber of FIG. 1 in a charging mode.

For the charging mode, the heat transfer fluid 131 is heated up from ambient conditions by the electrical heating device 201 (charging unit 200). This charged (heated) heat transfer fluid is guided into the heat exchange chamber interior 112 of the heat exchange chamber 11 for charging of the heat storage material. Thereby the heat exchange between the heat transfer fluid and the heat storage material takes place. With reference 2000 the temperature front at a certain time of this charging process is shown (FIG. 2). In addition, the temperature gradient 2001 which results in the temperature front is depicted.

For the discharging mode the heat exchange system 1 comprises one or several heat exchange chambers 11 mentioned above, an active fluid motion device 1341 to circulate the heat transfer fluid 131 and a thermal machine for re-electrification, which can be a water/steam cycle 1003. The working fluid of this cycle is water and steam. The water/steam cycle 1003 has the function of a discharging unit 400. Essential components of the steam turbine cycle 1003 are a steam turbine 1006 and a generator 1004.

In the discharging mode, the heat exchange flow of the heat transfer fluid is directed into the charging mode direction 136.

With the aid of the heat exchange system (heat exchanger) 1002 heat of the heat transfer fluid is transferred to the working fluid of the steam cycle 1003.

The heat exchange system 1 comprises a closed loop 1005. Heat exchange fluid which has passed the heat exchange chamber interior 112 is guided back into the heat exchange chamber interior 112.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A heat exchange system, comprising:
    at least one heat exchange chamber with heat exchange chamber boundaries which surround at least one heat exchange chamber interior of the heat exchange chamber,
    a charging unit for charging a heat transfer fluid, and
    a discharging unit for discharging the heat transfer fluid,
    wherein the heat exchange chamber, charging unit, and discharging unit form a closed loop system for the heat transfer fluid,
    wherein the heat exchange chamber boundaries comprise at least one first opening for guiding in an inflow of the heat transfer fluid into the heat exchange chamber interior during a charging mode, at least one second opening for guiding out an outflow of the heat transfer fluid out of the heat exchange chamber interior during the charging mode and guiding in an inflow of the heat transfer fluid into the heat exchange chamber interior during a discharging mode, and a third opening for guiding out an outflow of the heat transfer fluid during the discharging mode;
    wherein at least one heat storage material is arranged in the heat exchange chamber interior such that a heat exchange flow of the heat transfer fluid through the heat exchange chamber interior causes a heat exchange between the heat storage material and the heat transfer fluid;
    wherein the heat exchange system can be operated in the charging mode with a heat transfer from the heat transfer fluid to the heat storage material and the discharging mode with a heat transfer from the heat storage material to the heat transfer fluid;
    wherein the heat exchange system is equipped with at least one joint active fluid motion device with which the heat exchange flow of the heat transfer fluid through the heat exchange chamber interior during the charging mode and during the discharging mode is caused,
    wherein the heat exchange system is configured such that the at least one joint active fluid motion device receives the heat transfer fluid from the at least one second opening and provides the heat transfer fluid to the at least one first opening during the charging mode,
    wherein the at least one joint active fluid motion device receives the heat transfer fluid from the third opening and provides the heat transfer fluid to the at least one second opening during the discharging mode,
    wherein the charging unit comprises at least one electrical heating device which is selected from the group consisting of resistance heater, inductive heater, emitter of electromagnetic radiation and heat pump,
    wherein the discharging unit discharges the heat transfer fluid of the outflow from heat for production of electricity, and wherein the discharging unit comprises at least one water/steam cycle for driving a turbine of a steam power plant.

2. The heat exchange system according to claim 1, wherein the active fluid motion device is selected from the group consisting of blower, fan and pump.

3. The heat exchange system according to claim 1, further comprising at least one passive fluid control device for controlling the heat exchange flow through the heat exchange chamber interior which is selected from the group consisting of activatable bypass pipe, damper, flap, nozzle and valve.

4. The heat exchange system according to claim 1, wherein the heat storage material comprises at least one of sand and stones.

5. The heat exchange system according to claim 1, wherein the heat transfer fluid comprises a gas at ambient gas pressure.

6. The heat exchange system according to claim 5, wherein the gas at the ambient pressure is air.

7. The heat exchange system according to claim 1, comprising a closed loop, wherein the inflow of the heat transfer fluid comprises the outflow of the heat transfer fluid.

8. A method for exchanging heat by using a heat exchange system, comprising:
 guiding, in an operating mode of the heat exchange system, a heat exchange flow of the heat transfer fluid through a heat exchange chamber interior, and causing a heat exchange between heat storage material and the heat transfer fluid;
 wherein the operating mode is selected from the group consisting of charging mode and discharging mode;
 wherein the heat exchange flow for the charging mode and the heat exchange flow for the discharging mode are caused by a same active fluid motion device,
 wherein the heat exchange system is configured such that the same active fluid motion device receives the heat transfer fluid via an inlet port of the same active fluid motion device from at least one second opening and provides the heat transfer fluid to at least one first opening during the charging mode,
 wherein the same active fluid motion device receives the heat transfer fluid via the inlet port from at least one third opening and provides the heat transfer fluid to the at least one second opening during the discharging mode,
 wherein, in the charging mode, the heat transfer fluid is charged by a charging unit before guiding through the heat exchange chamber interior, and
 wherein, in the discharging mode, the heat transfer fluid is discharged for production of electricity by a discharging unit after guiding through the heat exchange chamber interior.

9. The method according to claim 8, wherein
 during the charging mode the heat exchange flow is directed in a charging mode direction;
 during the discharging mode the heat exchange flow is directed in a discharging mode direction; and
 the charging mode direction and the discharging mode direction are opposed to each other within the heat exchange chamber interior.

* * * * *